United States Patent [19]
Moreiras et al.

[11] 3,893,716
[45] July 8, 1975

[54] FLARELESS FITTING

[75] Inventors: Luis Moreiras, Northfield; Hiralal V. Patel, Euclid, both of Ohio

[73] Assignee: The Weatherhead Company, Cleveland, Ohio

[22] Filed: Apr. 1, 1974

[21] Appl. No.: 456,777

[52] U.S. Cl. ............... 285/3; 285/341; 285/382.7
[51] Int. Cl. ............................................. F16l 19/06
[58] Field of Search ............... 285/3, 4, 382.7, 341

[56] References Cited
UNITED STATES PATENTS

| | | | |
|---|---|---|---|
| 2,466,526 | 4/1949 | Wolfram | 285/382.7 X |
| 2,935,339 | 5/1960 | Frederick | 285/4 |
| 3,075,793 | 1/1963 | Lennon et al | 285/382.7 X |
| 3,169,786 | 2/1965 | Cator | 285/3 |

FOREIGN PATENTS OR APPLICATIONS

| | | | |
|---|---|---|---|
| 925,028 | 3/1955 | Germany | 285/3 |
| 1,233,372 | 5/1971 | United Kingdom | 285/382.7 |

*Primary Examiner*—Thomas F. Callaghan
*Attorney, Agent, or Firm*—McNenny, Farrington, Pearne & Gordon

[57] ABSTRACT

A tube coupling is disclosed which includes a tube, a body, a nut, a rear sleeve, and a front sleeve. The nut may be threadably advanced on the body from a starting position to a midway position and from the midway position to a tightened position. During movement of the nut from the starting position to the midway position only the front sleeve is radially inwardly contracted. During movement of the nut from the midway position to the tightened position, the front sleeve does not move and only the rear sleeve is radially inwardly contracted.

11 Claims, 4 Drawing Figures

FLARELESS FITTING

BACKGROUND AND SUMMARY OF THE INVENTION

This invention relates generally to flareless tube fittings (which are fittings for tubes in which the end of the tube is not flared prior to assembly of the fitting), and more particularly to multiple sleeve flareless tube fittings.

Flareless fittings for tubes have long been used for providing dependable couplings for tubes. One such flareless fitting which uses a single sleeve is disclosed in U.S. Pat. No. 2,201,404. Flareless fittings which use multiple sleeves are disclosed in U.S. Pat. Nos. 3,075,793 and 3,695,640.

The present invention provides a flareless fitting for a tube which differs in structure and mode of operation from these prior art flareless fittings and from other prior art fittings known to the applicant. The invention is characterized by a front sleeve and a rear sleeve in which the rear sleeve pushes the front sleeve axially forwardly until a cutting edge of the front sleeve is contracted radially inwardly to grip the tube and seal against leakage. A shear section on the rear sleeve then abruptly breaks to signal the installer of the fitting that the front sleeve has been seated and to permit the rear sleeve to move axially forwardly relative to the front sleeve so that the cutting edge of the rear sleeve is contracted radially inwardly by a camming surface on the front sleeve. The rear sleeve is axially slotted and the front sleeve is not slotted so that a substantially lesser axial force is required to contract the rear sleeve than is required to contract the front sleeve, so that the rear sleeve cannot push the front sleeve forwardly during this contraction of the rear sleeve. A positive stop then prevents further movement of the rear sleeve relative to the front sleeve to prevent over tightening of the rear sleeve and to signal the installer that assembly of the fitting has been completed.

More specifically, the fitting includes a tube, a body, a nut, a rear sleeve, and a front sleeve. The body and nut include threaded portions for axially advancing the nut relative to the body from a starting position to a midway position and from the midway position to a tightened position. The front sleeve includes a radially inwardly extending cutting edge for cutting into the tube, and the rear sleeve includes a frangible radially outwardly projecting flange which engages a shear wall of the front sleeve and which pushes the front sleeve axially forwardly relative to the tube as the nut is advanced from its starting position to its midway position to radially inwardly contract the front sleeve cutting edge into the tube.

At the midway position, the force in the axial direction transmitted by the rear sleeve flange to the front sleeve shear wall is equal to the shear strength of the flange so that the flange abruptly breaks to suddenly decrease the tightening torque on the nut. This signals the installer that the front sleeve is fully seated and permits axial movement of the rear sleeve relative to the front sleeve upon further tightening of the nut. As will be more readily apparent upon an understanding of the preferred embodiment of the invention shown in the drawings, the shear wall and flange are arranged so that the shear wall does not urge the flange radially inwardly.

Upon further tightening of the nut from the midway position to the tightened position, the rear sleeve advances axially forwardly while the front sleeve remains stationary, and a camming surface on the front sleeve contracts the rear sleeve cutting edge radially inwardly to grip the tube. When the tightened position is reached, a positive stop prevents further axial movement of the rear sleeve relative to the front sleeve. This provides an abrupt substantial increase in torque required to further tighten the nut. This signals the installer that the fully tightened position is reached even if the installer is not using a torque wrench to prevent over tightening of the fitting.

BRIEF DESCRIPTION OF THE DRAWINGS

These and other aspects and advantages of the present invention will be more readily apparent upon an understanding of the preferred embodiment of the invention shown in the accompanying drawings, wherein.

DETAILED DESCRIPTION OF THE DRAWINGS

Figure 1:
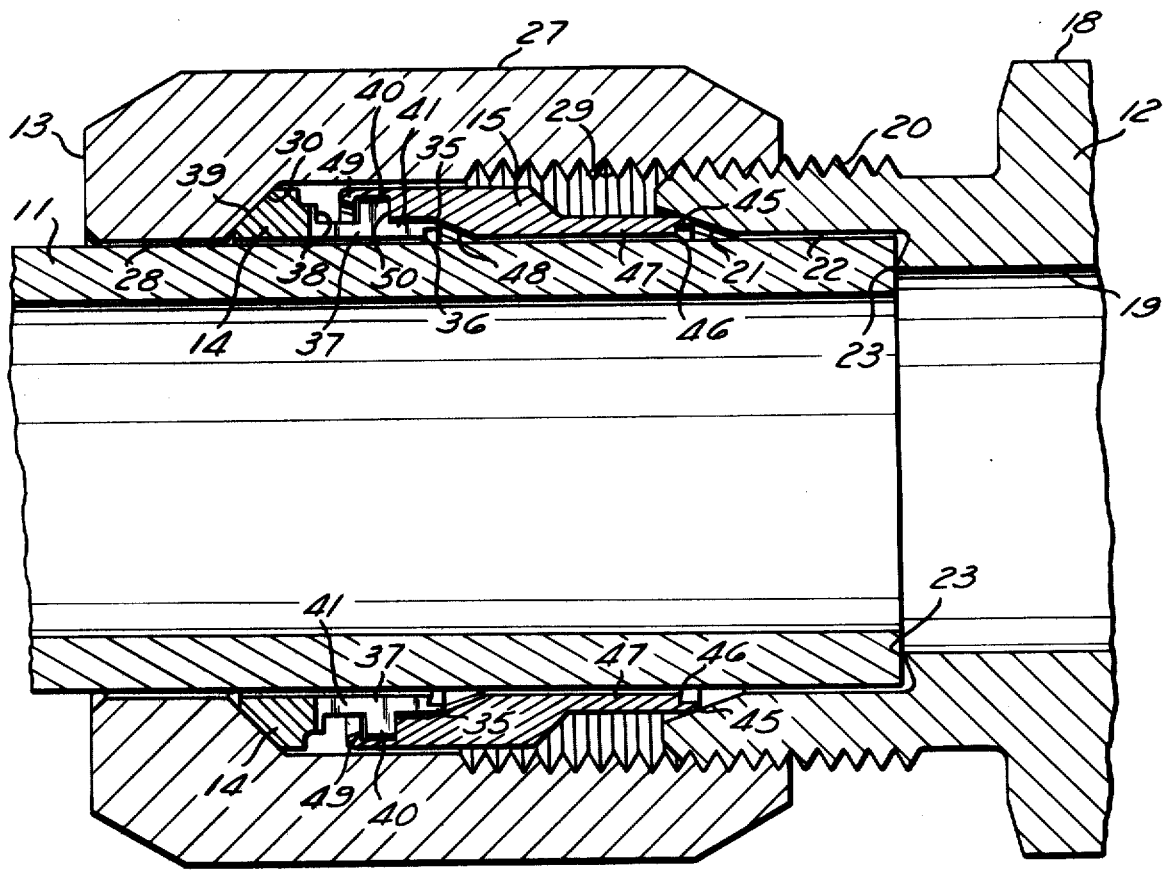
FIG. 1 is a cross-sectional side elevational view of a tube coupling according to the principles of the invention with the nut shown in its starting position relative to the body.

Referring now to the drawings in greater detail, FIG. 1 shows a flareless tube fitting which includes a tube 11, a body 12, a nut 13, a rear sleeve 14, and a front sleeve 15.

The tube 11 in the preferred embodiment is cylindrical and is a low carbon steel having a hardness of below 20 on the Rockwell C scale. The tube fitting will also work well with other tube materials including annealed stainless steel and cold drawn steel tubing, but the hardness of the tube must be less than the hardness of the cutting edges of the rear sleeve 14 and of the front sleeve 15 by a hardness difference of at least 15 points on the Rockwell C scale and preferably greater as further explained below. The tube fitting shown in FIG. 1 can also be used with a tube of aluminum or copper, but if the wall thickness of the aluminum or copper tube is not of great enough thickness to prevent radially inward deformation of the tube during tightening of the fitting, it will be necessary to insert a cylindrical mandrel into the interior of the tube to prevent such deformation of the tube during tightening. After tightening, the mandrel is removed to permit the flow of fluid through the tube.

The body 12 shown in FIG. 1 may be a straight line connector or a tee connector or it may be any other part to which it is desired to connect the tube 11. The body 12 is generally cylindrical and includes a hexagonal wrench receiving portion 18 for receiving a wrench during tightening of the fitting, a passage 19 for conveying fluid to or from the tube 11, and an externally threaded portion 20 for being threadably connected to the nut 13. The body 12 also includes a conical body camming surface 21 at its left or open end and an enlarged diameter tube receiving portion 22 disposed between the body camming surface 21 and the passage 19 for receiving the tube 11. An annular body cutting edge 23 is formed at the junction of the enlarged diameter portion 22 and the passage 19 to provide a stop for limiting axial movement of the tube 11 relative to the body 12 and for sealing against the end face of the tube 11.

The nut 13 as shown in FIG. 1 is generally cylindrical and includes a hexagonal wrench receiving portion 27 and an axial passage 28 which extends from end to end through the nut 13. The right end of the passage 28 includes an enlarged diameter internally threaded portion 29 for threadably engaging the threaded portion 20 of the body 12. A radially extending nut abutment surface 30 is located in the central region of the passage 28 for cooperating with the rear sleeve 14 in a manner described in detail below.

Figure 2:
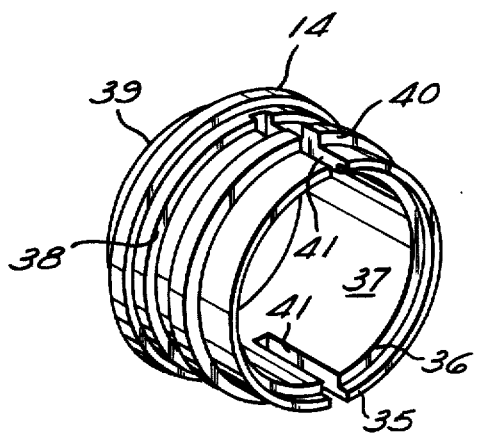
FIG. 2 is a perspective view showing the rear sleeve of the tube fitting shown in FIG. 1.

Referring now to FIGS. 1 and 2, the rear sleeve 14 is an annular sleeve and includes a pilot portion 35 having an annular rear sleeve cutting edge 36 for cutting into the outer surface of the tube 11 in a manner described below. A generally cylindrical portion 37 extends axially rearwardly from the pilot 35 and terminates at a radially extending annular stop wall 38. The left end of the rear sleeve 14 includes a rear sleeve abutment surface 39 which is engaged by the nut abutment surface 30 in a manner described below. A shear section or frangible annular flange 40 is formed integral with the rear sleeve 14 and projects radially outwardly from the cylindrical portion 37 for purposes described below. Two slots 41 extend axially rearwardly from the pilot 35 past the shear section 40 as best seen in FIG. 2 to permit radially inward deformation of the cylindrical portion 37 as described below. The normal or free diameter of the cutting edge 36 is slightly greater than the diameter of the outer surface of the tube 11 so that the rear sleeve 14 can slide on the tube 11 prior to tightening of the fitting. In the preferred embodiment, the rear sleeve 14 is case hardened to a hardness of about 50 on the Rockwell C scale, so that the cutting edge 36 of the rear sleeve 14 is of greater hardness than the tube 11. The rear sleeve 14 is not hardened throughout its thickness to prevent cracking of the rear sleeve 14 when its cylindrical portion 37 is deformed as explained below.

The front sleeve 15 as shown in FIG. 1 includes a front sleeve pilot portion 45 having an annular cutting edge 46 for cutting into the outer surface of the tube 11. The front sleeve 15 also includes a cylindrical portion 47 extending axially rearwardly from the pilot portion 45 and a front sleeve camming surface 48. An annular shoulder 49 is provided on the front sleeve 15 to retain the front sleeve 15 on the rear sleeve 14 as described below. The front sleeve 15 also includes a shear wall 50 which in the preferred embodiment extends solely in the radial direction for engaging the shear section 40 of the rear sleeve 14. For reasons discussed below, it is important that the shear wall 50 extend radially outwardly in a direction which is no greater than 90 degrees from a line extending solely axially from the radially innermost portion of the shear wall 50 in a direction forwardly toward the body 12 so that the shear wall 50 does not exert a radially inward force on the shear section 40. The front sleeve 15 is case hardened to a hardness of about 50 on the Rockwell C scale so that the front sleeve 15 and the rear sleeve 14 are of substantially equal hardness and so that the hardness of the front sleeve cutting edge 46 is greater than the hardness of the tube 11.

Prior to assembly of the various components shown in FIG. 1, the front sleeve 15 is assembled on the rear sleeve 14. This is accomplished by pushing the front sleeve 15 axially to the left as viewed in FIG. 1 while the rear sleeve 14 is held stationary. This causes the cylindrical portion 37 of the rear sleeve 14 to be contracted radially inwardly by the left end of the front sleeve 15 until the shear section 40 snaps past the retaining shoulder 49 of the front sleeve 15. The cylindrical portion 37 then springs back to its normal or free diameter so that the shear section 40 cooperates with the retaining shoulder 49 to hold the front sleeve 15 on the rear sleeve 14.

To assemble the fitting shown in FIG. 1, the nut 13 is first placed on the end of the tube 11. The rear sleeve 14 with the front sleeve 15 assembled thereon is then placed on the end of the tube 11, and the nut 13 is manually loosely threaded onto the body 12 to the starting position shown in FIG. 1. In this starting position, the nut abutment surface 30 loosely engages the rear sleeve abutment surface 39, the shear section 40 engages the shear wall 50 and the front sleeve pilot 45 engages the body camming surface 21. The cutting edges 36 and 46 are in their free or radially outward positions when the nut 13 is in the starting position.

Figure 3:
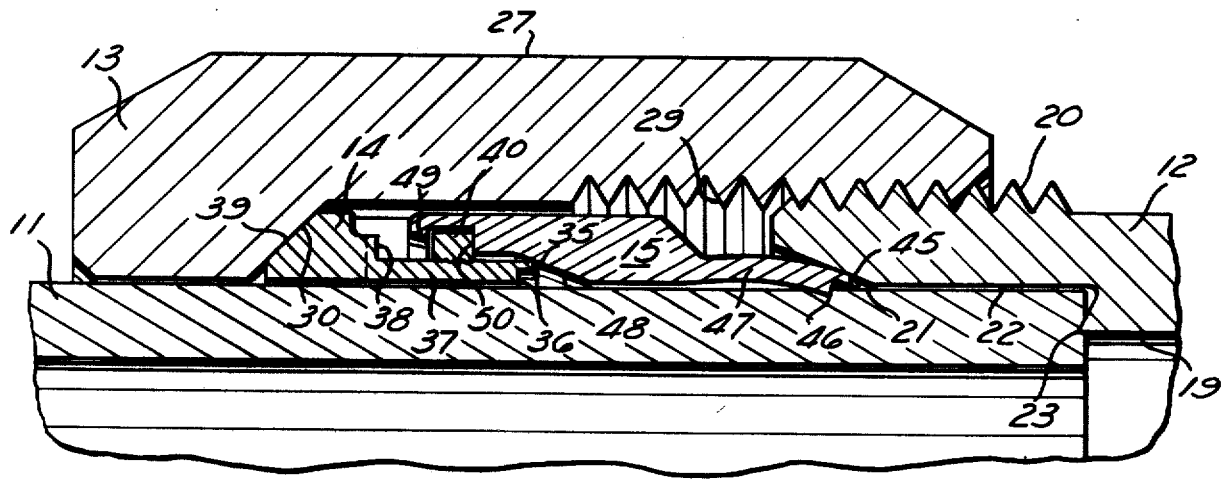
FIG. 3 is a cross-sectional side elevational view of the tube coupling shown in FIG. 1 but with the nut axially advanced to a midway position.

As the nut 13 is threadably advanced from the starting position shown in FIG. 1 to a midway position shown in FIG. 3, the shear section 40 prevents movement of the rear sleeve 14 relative to the front sleeve 15 so that the rear sleeve shear section 40 pushes the front sleeve 15 axially forwardly. This pushes the front sleeve pilot 45 against the body camming surface 21 to radially inwardly contract the cutting edge 46 into the outer surface of the tube 11. This compresses the pilot 45 and cutting edge 46 between the body camming surface 21 and the outer surface of the tube 11 to provide a seal to prevent leakage from the passage 19 and from the interior of the tube 11.

During this movement from the starting position shown in FIG. 1 to the midway position shown in FIG. 3, the rear sleeve pilot 35 and rear sleeve cutting edge 36 are not contracted radially inwardly but instead remain in their free or radially outward position shown in FIGS. 1 and 3. This is because the shear wall 49 is arranged as described above so that it does not exert a force on the shear section 40 in the radially inward direction. In this manner, the torque required to turn the nut 13 seats the front sleeve pilot 45 and cutting edge 46 and does not have to also seat the rear sleeve pilot 35 and cutting edge 36.

When the midway position shown in FIG. 3 is reached, the axial force transmitted by the rear sleeve shear section 40 to the front sleeve shear wall 50 is equal to the predetermined shear force of the frangible shear section 40. This causes the shear section 40 to abruptly break away from the cylindrical portion 37 to render the shear section 40 abruptly inoperable to transmit a force from the rear sleeve 14 to the front sleeve 15 in the axial direction. This abruptly decreases the turning torque required to turn the nut 13 so that the installer is signaled that the front sleeve 15 is seated. Because the shear wall 49 is arranged as described above so that it does not exert a force on the shear section 40 in the radially inward direction, there is no gradual bending over of the shear section 40 so that the shear section 40 is abruptly broken. After this breakage of the shear section 40, all further forces in the axial direction transmitted from the rear sleeve 14 to the front sleeve 15 are transmitted solely at the location of the front sleeve camming surface 48.

Figure 4:
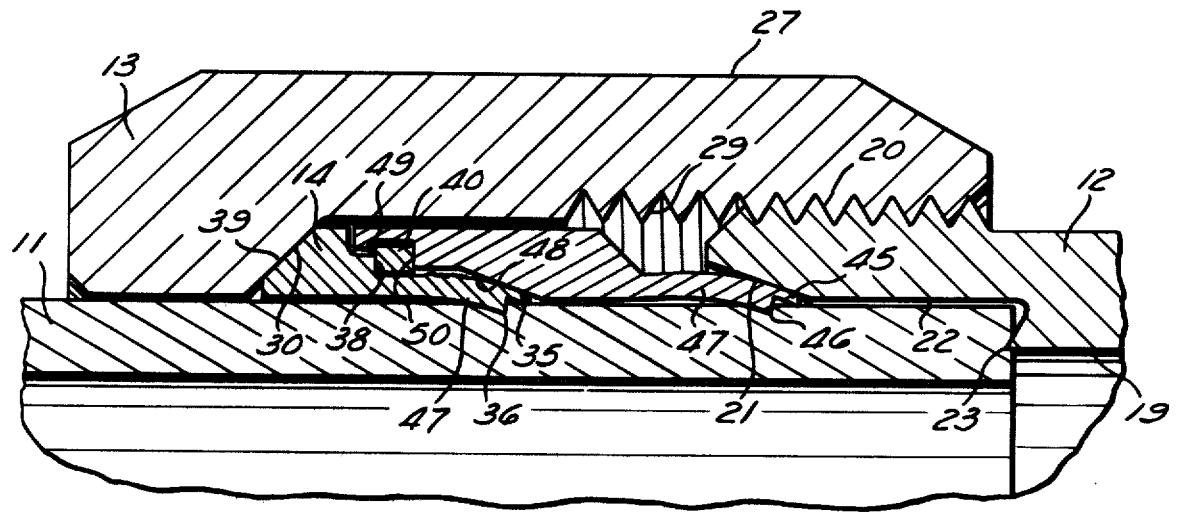
FIG. 4 is a cross-sectional side elevational view of the tube coupling shown in FIG. 1 but with the nut axially advanced to its tightened position.

As the nut 13 is axially advanced from the midway position shown in FIG. 3 to a tightened position shown in FIG. 4, the rear sleeve 14 and the nut 13 are axially advanced along the tube 11 while the front sleeve 15 remains stationary relative to the tube 11. During this portion of the tightening, the rear sleeve pilot 35 and cutting edge 36 are contracted radially inwardly by the front sleeve camming surface 48 into the outer surface of the tube 11. Because the rear sleeve 14 is provided with axial slots 41, a substantially lesser axial force exerted by the nut 13 on the rear sleeve abutment surface 39 is required to contract the rear sleeve 14 than is required to contract the front sleeve 15, so that the rear sleeve 14 cannot push the front sleeve 15 axially forwardly relative to the tube 11 during this contraction of the rear sleeve 14. In this manner, the tube coupling provides positive and absolute sequential contracting of the sleeves 14 and 15 whereby only one of the sleeves is seated at any one time so that the torque required to turn the nut 27 is minimized.

When the tightened position shown in FIG. 4 is reached, the shear section 40 engages the stop wall 38 to positively prevent further axial movement of the rear sleeve 14 relative to the front sleeve 15. This causes an abrupt increase in the torque required to turn the nut 27, since any further tightening would have to advance both the front sleeve pilot 45 and cutting edge 46 and the rear sleeve pilot 35 and cutting edge 36 along the tube 11. This abrupt increase in torque required to turn the nut 27 signals the installer that the rear sleeve 14 has been seated and that the fitting is fully tightened.

In this manner, the fitting according to the principles of the invention requires a turning torque on the nut 27 for assembly which is only equal to the torque required to seat the front sleeve pilot 45 and cutting edge 46 during movement from the starting position to the midway position. At the midway position, the turning torque abruptly drops to signal the installer that the front sleeve is seated. As the nut 13 is tightened from the midway position to the tightened position, the torque necessary to tighten the nut 27 is only the torque required to seat the rear sleeve pilot 35 and cutting edge 36. When the fully tightened position is reached, the torque required to rotate the nut 27 is abruptly increased to signal the installer, even without use of a torque wrench, that the fitting is fully installed.

It may be noted that the end face of the tube 11 is pushed slightly axially into the annular cutting edge 23 of the body 12 as the nut 13 is threadably tightened from the starting position shown in FIG. 1 to the midway position shown in FIG. 3. Only a small amount of such axial movement of the tube 11 relative to the body 12 takes place during this tightening, and the cutting edge 23 contributes to the prevention of fluid leakage from the passage 19 and from the interior of the tube 11. However, the seal provided by the cutting edge 23 is not the primary seal of the fitting, but instead the leakage of fluid from the passage 19 and from the interior of the tube 11 is prevented primarily by the portion of the front sleeve 15 which is compressed between the body camming surface 21 and the tube 11.

What is claimed is:

1. In combination, a tube, a body, a nut, a rear sleeve, and a front sleeve, said body including a threaded body portion and a conical internal body camming surface, said nut including a threaded nut portion for threadably engaging said threaded body portion to axially advance said nut relative to said body from a starting position to a midway position and from said midway position to a tightened position, and a nut abutment surface, said front sleeve being annular and being disposed between said rear sleeve and said body camming surface, said front sleeve including a front sleeve annular pilot at one of its ends and a conical internal front sleeve camming surface at its other end, said rear sleeve including a rear sleeve annular pilot at one of its ends and a rear sleeve abutment surface at its other end, a radially outwardly extending shear section means on one of said sleeves transmitting a force in the axial direction between said sleeves when said nut is axially advanced from said starting position to said midway position, said shear section means being frangible to render said shear section means abruptly inoperable to transmit said force when said nut is in said midway position, said front and rear sleeve pilots each being in a radially outward position and said nut abutment surface loosely engaging said rear sleeve abutment surface when said nut is in said starting position, said front sleeve pilot being radially inwardly contracted from said radially outward position by operation of said body camming surface and said rear sleeve pilot being in said radially outward position when said nut is in said midway position, said nut abutment surface exerting a predetermined force in the axial direction on said rear sleeve abutment surface when said nut is in said midway position, said predetermined axial force being equal to the shear force of said shear section means and said shear section means being abruptly broken and rendered inoperable to transmit forces in the axial direction when said midway position is reached whereby the torque required to advance said nut is abruptly decreased when said nut reaches said midway position, said rear sleeve pilot engaging said front sleeve internal camming surface and providing the sole means for transmitting forces in the axial direction from said rear sleeve to said front sleeve when said nut is axially advanced from said midway position to said tightened position whereby only said nut and said rear sleeve are axially advanced relative to said tube when said nut is advanced from said midway position to said tightened position, said rear sleeve pilot being radially inwardly contracted from said radially outward position by operation of said front sleeve internal camming surface when said nut is in said tightened position, said rear sleeve is axially slotted from said rear sleeve pilot, and said rear sleeve pilot is radially inwardly contractible by a substantially lesser axial force than said front sleeve pilot whereby said rear sleeve cannot push said front sleeve axially forwardly when said nut is advanced from said midway position to said tightened position.

2. The combination defined in claim 1 wherein said shear section means includes a frangible radially outwardly projecting annular flange formed integral with said rear sleeve and a radially extending annular shear wall formed integrally with said front sleeve.

3. The combination as defined in claim 2 wherein said shear wall extends in a direction which is no greater than 90 degrees from a line extending solely axially from the radially innermost portion of said shear wall in a direction toward said body whereby said shear wall exerts a force against said flange having a radially inward component not exceeding zero.

4. The combination as defined in claim 1 including stop means preventing further axial movement of said rear sleeve relative to said front sleeve when said nut is in said tightened position.

5. In combination, a tube, a body, a nut, a rear sleeve, and a front sleeve, said body including a threaded body portion and a conical internal body camming surface, said nut including a threaded nut portion for threadably engaging said threaded body portion to axially advance said nut relative to said body from a starting position to a midway position and from said midway position to a tightened position, and a nut abutment surface, said front sleeve being annular and being disposed between said rear sleeve and said body camming surface, said front sleeve including a front sleeve annular pilot at one of its ends and a conical internal front sleeve camming surface at its other end, said rear sleeve including a rear sleeve annular pilot at one of its ends and a rear sleeve abutment surface at its other end, a radially outwardly extending shear section means on one of said sleeves providing the sole means transmitting a force in the axial direction between said sleeves when said nut is axially advanced from said starting position to said midway position, said shear section means being frangible to render said shear section means abruptly inoperable to transmit said force when said nut is in said midway position, said front and rear sleeve pilots each being in a radially outward position and said nut abutment surface loosely engaging said rear sleeve abutment surface when said nut is in said starting position, said front sleeve pilot being radially inwardly contrated from said radially outward position by operation of said internal body camming surface and said rear sleeve pilot being in said radially outward position when said nut is in said midway position, said nut abutment surface exerting a predetermined force in the axial direction on said rear sleeve abutment surface when said nut is in said midway position, said predetermined axial force being equal to the shear force of said shear section means and said shear section means being abruptly broken and rendered inoperable to transmit forces in the axial direction when said midway position is reached whereby the torque required to advance said nut is abruptly decreased when said nut reaches said midway position, said rear sleeve pilot engaging said front sleeve internal camming surface and providing the sole means for transmitting forces in the axial direction from said rear sleeve to said front sleeve when said nut is axially advanced from said midway position to said tightened position whereby only said nut and said rear sleeve are axially advanced relative to said tube when said nut is advanced from said midway position to said tightened position, and said rear sleeve pilot being radially inwardly contracted from said radially outward position by operation of said front sleeve internal camming surface when said nut is in said tightened position.

6. The combination defined in claim 5 wherein said shear section means includes a frangible radially outwardly projecting annular flange formed integral with said rear sleeve and a radially extending annular shear wall formed integrally with said front sleeve.

7. The combination as defined in claim 6 wherein said flange is disposed on said rear sleeve between said rear sleeve pilot and said rear sleeve abutment surface, said rear sleeve is axially slotted from said rear sleeve pilot to and beyond said flange, and said rear sleeve pilot is radially inwardly contractible by a substantially lesser axial force than said front sleeve pilot whereby said rear sleeve cannot push said front sleeve axially forwardly when said nut is advanced from said midway position to said tightened position.

8. The combination as defined in claim 7 wherein said shear wall extends solely in the radial direction whereby said shear wall exerts a force against said flange solely in the axial direction.

9. The combination as defined in claim 7 wherein said shear wall extends in a direction which is no greater than 90° from a line extending solely axially from the radially innermost portion of said shear wall in a direction toward said body whereby said shear wall exerts a force against said flange having a radially inward component not exceeding zero.

10. The combination as defined in claim 7 including stop means preventing further axial movement of said rear sleeve relative to said front sleeve when said nut is in said tightened position.

11. The combination as defined in claim 5 wherein said shear section means mechanically connects said front and rear sleeves when said nut is in said starting position.

* * * * *